Nov. 1, 1966  J. W. HICKS, JR  3,282,191
OPTICAL IMAGE TRANSFER DEVICE
Filed June 1, 1964
2 Sheets-Sheet 1
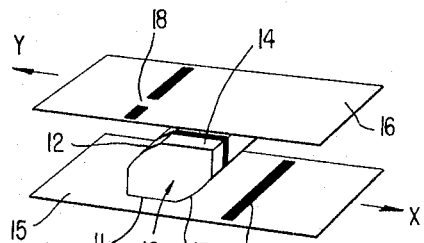
FIG 1
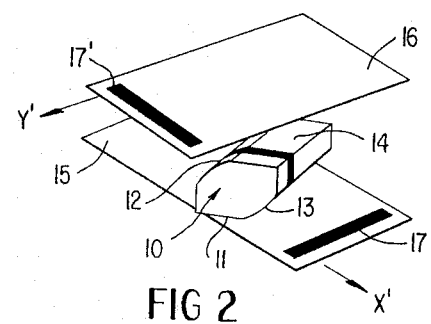
FIG 2
FIG 4
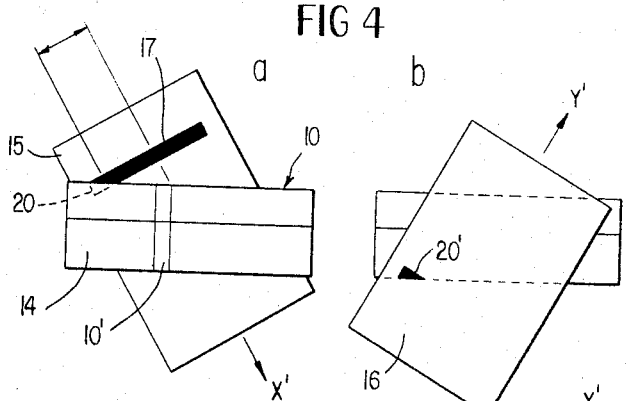
FIG 3
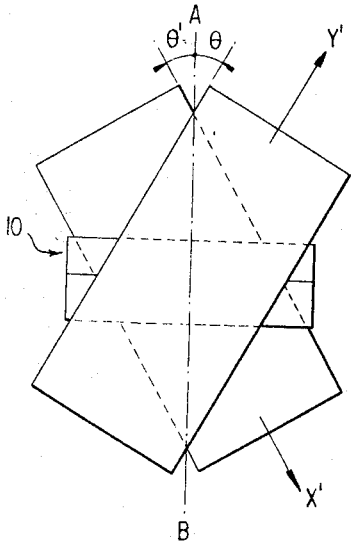
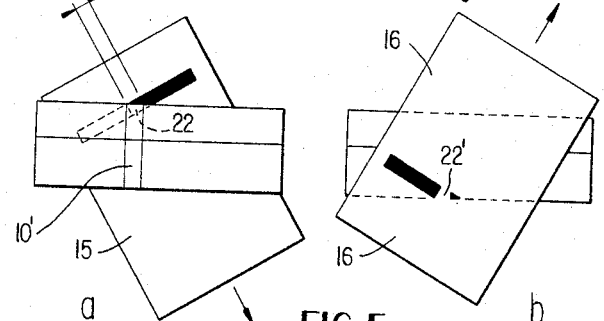
FIG 5
FIG 6
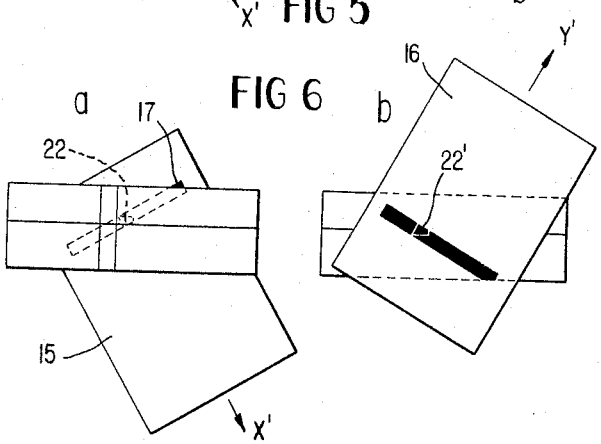
INVENTOR.
JOHN W. HICKS, JR.
BY
*Stowell & Stowell*
ATTORNEYS

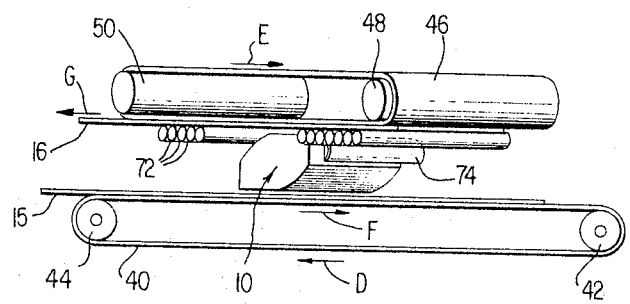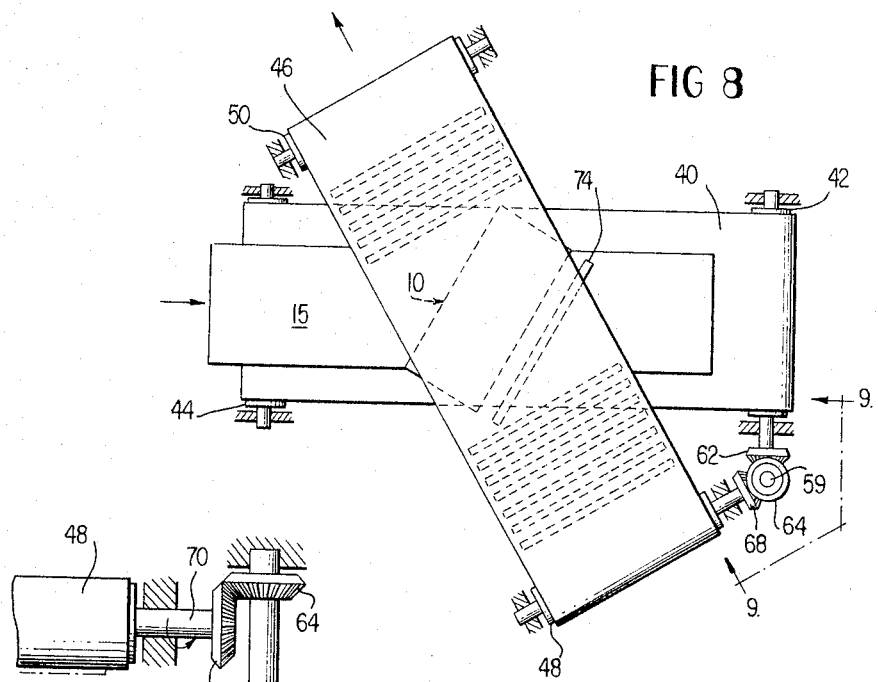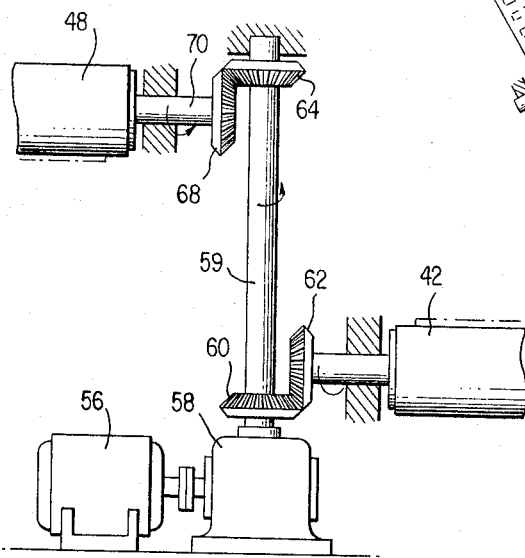

United States Patent Office 3,282,191
Patented Nov. 1, 1966

3,282,191
OPTICAL IMAGE TRANSFER DEVICE
John W. Hicks, Jr., Fiskdale, Mass., assignor to Mosaic Fabrications, Inc., Southbridge, Mass., a corporation of Massachusetts
Filed June 1, 1964, Ser. No. 371,467
3 Claims. (Cl. 95—73)

This invention relates to an optical image transfer device and more particularly to a copying machine employing an optical device formed of a plurality of light conducting plates arranged in parallel relationship.

In my copending application Serial No. 154,648, filed November 24, 1961, now abandoned, and assigned to the same assignee to which this application is assigned, a copying device employing such an optical image transfer element is disclosed. In that application, there is disclosed a method of making such an optical image transfer device and further how to employ such a device in a copying machine.

In the manufacture of an optical device formed of a plurality of light conducting plates arranged in parallel relationship, it sometimes occurs that the device is defective either by reason of optical imperfections in one or more of the plates, or by reason of improper bonding of the plates to the light-insulating plates of lower index of refraction, or by reason of improper grinding and polishing at the edge portions thereof which form reflecting or light transmitting surfaces. A flaw in one or more of the light transmitting plates or the light-insulating plates results, in the case of a copying machine of the type disclosed in the above-identified application, in what is known as striations. The latter manifest themselves after the light sensitive paper has been developed as a plurality of channels or streaks, each channel or streak representing a loss of information across its width and breadth.

It is an object of the present invention to provide a copying device employing an optical transfer device comprising a plurality of light conducting plates in parallel relationship which will prevent striations from appearing on the finished and developed copying paper in spite of structural imperfections which may be present in the optical image transfer device itself.

It is a further object of the present invention to provide a copying machine employing an optical image transfer device comprising a plurality of light transmitting plates arranged in parallel relationship wherein the object to be copied and the image receiving material are moved in planes parallel to the planes of the light receiving and light emitting surfaces of the optical image transfer device along paths of travel intersecting at identical angles relative to the median plane parallel to the plates thereof and normal to the light receiving and light transmitting surfaces thereof.

These and other objects and advantages are provided in a copy reproducing device including an image transfer member consisting of a plurality of light transmitting plates arranged in parallel relationship, spaced parallel light receiving and light emitting surfaces in normal arrangement to the planes of the plates, means for supporting an object to be copied in the optical path of the light receiving surface of the image transfer member, means for supporting an image receiving member in the optical path of the image emitting surface of the image transfer member, means for causing relative movement between the object to be copied and the image receiving member in planes parallel to the planes of the light receiving and light emitting surfaces along paths of travel intersecting at numerically identical small angles relative to the median plane parallel to the plates and normal to the light receiving and light transmitting surfaces thereof and in opposite directions relative to the median plane.

The invention will be more particularly described with reference to the accompanying drawings wherein:

FIG. 1 is a diagrammatic representation of a copy reproducing device of the type illustrated in my said copending application Serial No. 154,648 illustrating the effect of a flaw in one of the parallel plates;

FIG. 2 is a diagrammatic view of a copying machine of the present invention illustrating the elimination of striation caused by an imperfection in one or more of the light transmitting plates;

FIG. 3 is a diagrammatic top plan view of the device illustrated in FIG. 2;

FIGS. 4a, 4b, 5a, 5b, 6a and 6b are diagrammatic illustrations of the principle of stria elimination in a copying machine constructed in accordance with the present invention;

FIG. 7 is a perspective view through a copy machine constructed in accordance with this invention;

FIG. 8 is a top plan view of the device illustrated in FIG. 7; and

FIG. 9 is a section substantially on line 9—9 of FIG. 8.

Referring to the drawings and, in particular, to FIGS. 1 through 6, 10 generally designates an optical image transfer device of the type disclosed and claimed in my copending application Serial No. 154,648. The optical image transfer device 10 consists of a plurality of thin glass or other light transmitting plates arranged in parallel relationship with the extended surface of the light transmitting plates being optically insulated from each other by coextensive plates of a material of lower index of refraction than the light transmitting plates whereby light directed to the lower image receiving surface 11 will be internally reflected by curvilinear surfaces 12 and 13 and transferred to the light emitting surface 14 as an image reversed in the top-to-bottom direction. Thus, the device may be used in a direct scanning and copying machine and the scanning need not be limited to a narrow scan line to avoid blurring of the image transferred by the device.

As disclosed in my said copending application, the plates making up the optical image transfer device 10 are very thin and a suitable thickness of about 50 microns or a range from about .001 to about .010 inch has been found to provide very satisfactory results.

Reversal of the mirror image is accomplished by moving the object to be copied designated 15 and the image receiving member designated 16 in opposite directions across the optical image transfer device as indicated by directional arrows X and Y.

Now, referring particularly to FIG. 1, if one of the very small plates forming the optical transfer device is defective, a portion of the material to be reproduced would not be transferred to the image receiving material 16. In FIGS. 1 and 2 of the drawings, a defective plate is designated by the dark shading and in FIG. 1 it will be noted that that portion of the object 17 appearing as a horizontal black bar on the object to be copied 15 is not reproduced on the image receiving material 16 and a blank space 18 appears on the copy 16.

It has been found that the effects of a defective plate in the image transferring element 10 can be eliminated by moving the object to be reproduced and the image receiving material along paths of travel indicated by directional arrows X' and Y', that is, along paths of travel at numerically identical small angles $\theta$ and $\theta'$ relative to the medium plane AB parallel to the plates forming the assembly 10 and normal to the light receiving and light emitting surfaces 11 and 14 as more clearly illustrated in FIG. 3 of the drawings. Referring to FIG. 2, the object to be copied comprising a horizontal bar 17 on sheet 15 is transferred in toto as bar 17' on copy sheet 16.

The novel function of the present invention is diagrammatically illustrated in FIGS. 4a and b, 5a and b, and 6a and b. Referring to FIG. 4a, the sheet of material 15 having a horizontal bar 17 extending across the surface thereof is to be reproduced on the copy sheet 16. In FIG. 4a a first bit 20 of the printed bar 17 has passed within the field of the optical image receiving surface 11 and as illustrated in FIG. 4b appears as image 20' on copy sheet 16. Referring to FIG. 5a, that portion of the printed bar 17, represented by bit 22, is now passing in the optical field of the defective plate element 10' and is reproduced as a blank area 22' on copy sheet 16 in FIG. 5b of the drawings.

Now, referring to FIG. 6a, the portion of the printed bar 17 on sheet 16 which failed to print, i.e., bit 22, is illustrated in dotted lines; however, its changed position due to its path of travel being at an angle to the median line parallel to the plates forming the optical transfer device is now such that bit 22 is transmitted to the copy sheet 16 as bit 22', thus completing the reproduction of the printed bar 17 except for that small increment which has not yet moved into the optical path of the image receiving surface of the optical image transfer device.

The small angle to which the object to be copied and the image receiving surface are skewed to the medium plane parallel to the plates and normal to the light receiving and light transmitting surfaces thereof is not particularly critical and this angle would in part be determined by the thickness of the plates forming the optical image device. As the thickness of the plates is decreased, the angles $\theta$ and $\theta'$ may be decreased and still provide satisfactory results.

Thus it will be seen that the direction of travel of the object to be copied 15 and the image receiving sheet 16 is 180° minus $2\theta$. Satisfactory results have been obtained where the angle $\theta$ is from about 1° to about 20°.

Referring now to FIGS. 7 through 9, apparatus for carrying out the transfer of the object to be copied and the image receiving material may comprise various mechanical expedients. However, satisfactory results are provided by the illustrated structures described hereinbelow.

In FIGS. 7 through 9 of the drawings, an endless belt 40 is mounted between a drive roll 42 and an idler roll 44. A complementary belt 46 is mounted in spaced relationship to the belt 40 between a drive roll 48 and an idler roll 50. Drive roll 42 for belt 40 is connected to the output shaft of a motor 56 via a gear box 58, shaft 59 and cooperating bevel gears 60 and 62.

Roll 48 is also driven by the motor 56 via a pair of bevel gears 64 and 68 with bevel gear 64 being connected to shaft 59 and bevel gear 68 being connected to a shaft 70 rotating with the roll 48 whereby the belt 40 rotates in the direction of directional arrow D, belt 46 rotates in the direction of directional arrow E, the sheet to be copied moves in the direction of directional arrow F and the image receiving material 16 moves in the direction of directional arrow G. The assembly may also include suitable infeed rolls and output rolls not illustrated in the drawings and the upper flight 46 may also include a plurality of idler rolls generally designated 72 for supporting the sheet or web of material 16 to which an image of the indicia on the original document 15 is to be transferred.

The assembly may also include a source of light 74 which may be provided with a suitable reflector for directing light to the light receiving surface 11 of the optical transfer device 10.

In the photographic art, it is well known that if a certain light sensitive emulsion has an optimum exposure time, an exposure less than this optimum will nevertheless yield a final reproduction which is distinct, recognizable, and which only suffers slightly from a loss of information. Recognizing this, if the image transfer device 10 is skewed to the direction of movement of the object to be copied and the image receiving sensitive paper while the reproduction is being made, the optical anisotrophy arising from a flaw or flaws in the optical transfer device 10 will be distributed over a width of the sensitive paper equal to the number of light transmitting plates which are effective to transfer a quantity of the object to the image receiving paper. Thus, the device distributes the effect of the optical flaw over the number of plates available to transfer the particular bit and only diminishes the effective exposure by a fraction of the exposure time. Thus, by way of example, if a certain area of the copy paper passes through six plates and one of the six plates transmits no light, then the reproduced area will receive ⅚ of the light it would have received if all six plates had been perfect. By making a proper selection of plate widths depending upon the sensitivity of the copying paper and the speed which it travels through the copy machine, no striations will appear in the finished reproduction and the loss of exposure time is generally so slight as to be unnoticeable in the finished product.

From the foregoing description of the present invention, it will be seen that the optical image transfer device fully accomplishes the aims and objects hereinbefore set forth.

I claim:

1. In a copy reproducing device, an image transfer member consisting of a plurality of light transmitting plates arranged in parallel relationship, spaced parallel light receiving and light emitting surfaces in normal arrangement to the planes of said plates, means for supporting an object to be copied in the optical path of the light receiving surface of said image transfer member, means for supporting an image receiving member in the optical path of the image emitting surface of said image transfer member, means for causing relative movement between the object to be copied and the image receiving member in planes parallel to the planes of the light receiving and light emitting surfaces along paths of travel intersecting at numerically identical small angles relative to the median plane parallel to the plates and normal to said light receiving and light emitting surfaces and in opposite directions relative to said median plane.

2. In a copy reproducing device, an image transfer member consisting of a plurality of light transmitting plates arranged in parallel relationship, spaced parallel light receiving and light emitting surfaces in normal arrangement to the planes of said plates, means for supporting an object to be copied in the optical path of the light receiving surface of said image transfer member, means for supporting an image receiving member in the optical path of the image emitting surface of said image transfer member, means for causing relative movement between the object to be copied and the image receiving member in planes parallel to the planes of the light receiving and light emitting surfaces along paths of travel intersecting at numerically identical small angles $\theta$ relative to the median plane parallel to the plates and normal to said light receiving and light emitting surfaces and in directions 180° minus $2\theta$ apart.

3. In a copy machine, an optical device comprising a plurality of light transmitting plates in parallel arrangement with a material of lower index of refraction than said light transmitting plates between opposed surfaces of said plates and coextensive therewith adapted to channel light entering light receiving edge portions of said plates in a direction substantially parallel to the opposed surface thereof, means for causing relative movement between an object to be copied and an image receiving member in planes parallel to the planes of the light receiving and light emitting surfaces along paths of travel intersecting at numerically identically small angles $\theta$ relative to the median plane parallel to the plates and normal to said light receiving and light emitting surfaces and in directions 180° minus $2\theta$ apart.

References Cited by the Examiner
UNITED STATES PATENTS

| | | | |
|---|---|---|---|
| 2,951,736 | 9/1960 | Black | 95—74 X |
| 3,060,805 | 10/1962 | Brumley | 88—24 X |
| 3,060,806 | 10/1962 | Lewis et al. | 88—24 X |

JULIA E. COINER, *Primary Examiner.*